United States Patent Office 3,045,014
Patented July 17, 1962

3,045,014
PRODUCTION OF 1-ARYL-4,5-DIHALOGEN-PYRIDAZONES-(6)
Hans Ruprecht Hensel, Heidelberg, and Hans Baumann, Ludwigshafen (Rhine), Germany, assignors to Badische Anilin- & Soda-Fabrik Aktiengesellschaft, Ludwigshafen (Rhine), Germany
No Drawing. Filed June 20, 1960, Ser. No. 37,069
Claims priority, application Germany June 23, 1959
1 Claim. (Cl. 260—250)

This invention relates to a process for the production of 1-aryl-4,5-dihalogenpyridazones-(6).

By a prior art method 4,5-dichlorpyridazone-(6) is obtained by heating mucochloric acid semicarbazone in anhydrous acetic acid at 100° to 110° C. for a long time and precipitating the reaction product by adding water. According to another prior method 1-phenyl-4,5-dihalogenpyridazones-(6) can be prepared by boiling mucohalic acid phenyl hydrazones in anhydrous acetic acid or acetic anhydride. The mucohalic acid hydrazones are prepared from mucohalic acids and hydrazines, in general while using organic solvents.

These methods are relatively expensive for the industrial production of 1-aryl-4,5-dihalogenpyridazones-(6); moreover, they are unsuitable especially when water-soluble hydrazines are used as these are difficult to isolate from the aqueous reaction mixtures when prepared by reduction of diazonium salts. On the other hand 1-aryl-4,5-dihalogenpyridazones-(6) which have been prepared by the use of water-soluble hydrazines are especially valuable by reason of their improved water-solubility.

It is the object of the present invention to provide a process for the production of 1-aryl-4,5-dihalogenpyridazones-(6) which does not have the said disadvantages.

We have found that 1-aryl-4,5-dihalogenpyridazones-(6) of the general formula

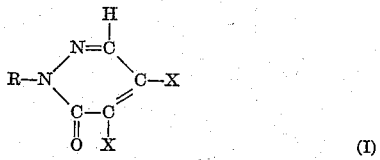

(I)

in which X represents a chlorine or bromine atom and R represents an alpha-naphthyl radical, beta-naphthyl radical or a radical of the general formula

(II)

in which $R_1$ represents a hydrogen atom, a carboxy group or a sulfonic acid group, $R_2$ represents a hydrogen atom, a nitro group, a formylamino group, an acetylamino group, an oxalylamino group or a benzoylamino group and $R_3$ represents a hydrogen atom, a methyl group or a methoxy group, are obtained in a simple way and with excellent yields by reacting mucochloric acid or mucobromic acid in aqueous mineral acid solution at room temperature with alpha-naphthyl hydrazine, beta-naphthyl hydrazine or a phenyl hydrazine of the general formula

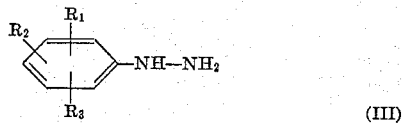

(III)

in which $R_1$, $R_2$ and $R_3$ have the meanings given above, and treating the reaction product with concentrated sulfuric acid, or by heating mucochloric acid or mucobromic acid together with alpha-naphthyl hydrazine, beta-naphthyl hydrazine or a phenyl hydrazine of Formula III in mineral acid aqueous solution. The process according to this invention is preferably carried out at temperatures of about 70° to about 100° C.

The term "room temperature" means that during the reaction no additional heating by means of a source of heat is necessary. By "concentrated sulfuric acid" we mean a sulfuric acid with a content of 90 to 100% by weight of $H_2SO_4$.

Preferred mineral acids are hydrochloric acid and sulfuric acid, but other mineral acids, such as phosphoric acid, perchloric acid or nitric acid, may also be used. The concentration of said acids may vary within wide limits.

The yields of the 1-aryl-4,5-dihalogenpyridazones-(6) obtained in the aforesaid manner generally come very close to those calculated theoretically, even when water-soluble hydrazines are used as initial materials.

Halogenpyridazones-(6) have in some cases fungicidal properties, in some cases bactericidal or herbicidal properties. Furthermore, they are valuable precursors for organic syntheses.

The parts specified in the examples are parts by weight unless otherwise indicated. The parts by volume bear the same relation to parts by weight as does the liter to the kilogram.

Example 1

A solution of 140 parts of 1-amino-3-nitrobenzene and 250 parts of hydrochloric acid in 1000 parts of water is diazotized at 5° to 10° C. with a solution of 70 parts of sodium nitrite in 150 parts of water and the diazo solution is allowed to flow into a solution of 700 parts of crystallized tin (II) chloride. This mixture is combined with a solution of 170 parts of mucochloric acid in 500 parts of water and the reaction mixture is stirred for 6 hours at room temperature. The deposited reaction product is separated off and dried, 240 parts of the nitrophenyl hydrazone of mucochloric acid having the melting point 199° C. being obtained. The total amount of the nitrophenyl hydrazone is introduced gradually into 800 parts by volume of concentrated sulfuric acid and the solution thus formed is stirred for 6 to 8 hours at 20° to 25° C. The mixture is then poured onto ice and filtered. After drying, 210 parts of 1-(3-nitrophenyl)-4,5-dichlorpyridazone-(6) are obtained in the form of a yellowish powder of the melting point 208° C.

30 parts of 1-(3-nitrophenyl)-4,5-dichlorpyridazone-(6) are suspended at 80° C. in a mixture of 250 parts of water and 50 parts of propanol and this suspension is allowed to flow within 30 to 40 minutes into a suspension of 50 parts of iron powder in 300 parts of water and 2 parts of acetic acid heated to 100° C. The product is filtered and from the filtrate there are obtained by cooling 20 parts of 1-(3-aminophenyl)-4,5-dichlorpyridazone-(6) of the melting point 132° C.

Elementary analysis gives the result: Calculated—C, 46.90; H, 2.73; O, 6.25; N, 16.41; Cl, 27.7. Found—C, 46.85; H, 3.00; O, 6.52; N, 15.71; Cl, 27.5.

Example 2

28 parts of 1-amino-3-acetylaminobenzene-6-sulfonic acid are dissolved in 80 parts of 5% aqueous sodium hydroxide solution, an aqueous solution of 7 parts of sodium nitrite is added and the mixture is allowed to flow at 0° C. into a solution of 35 parts of hydrochloric acid in 200 parts of water. When the diazotization is complete, a solution of 70 parts of crystallized tin (II) chloride in 300 parts of 5% hydrochloric acid is added and this solution is combined with a solution of 17 parts of mucochloric acid in 150 parts of water. The mixture is stirred for 4 to 6 hours at room temperature, and the deposited 3-acetylamino-6-sulfophenyl hydrazone of mucochloric acid is filtered off and dried; it has a melting point of 235° C. The total amount of the reaction product is introduced with cooling into 150 parts of concentrated sulfuric acid and the mixture is stirred for 6 hours at room temperature and then poured onto ice. After filtration and drying there are obtained 28 parts of 1-(3-amino-6-sulfophenyl)-4,5-dichlorpyridazone-(6) in the form of a brown powder of the melting point 312° C.

The result of elementary analysis is: Calculated—C, 35.7; H, 2.08; O, 19.05; N, 12.5; S, 9.52; Cl, 21.1. Found—C, 35.2; H, 2.42; O, 19.71; N, 12.1; S, 9.25; Cl, 20.6.

Example 3

A solution of 11 parts of phenyl hydrazine in 200 parts of water and 30 parts of hydrochloric acid is combined with a solution of 17 parts of mucochloric acid in 100 parts of water and the mixture is stirred for an hour at room temperature and then heated at 90° to 100° C. while stirring for 3 hours. The deposited reaction product is filtered off and dried, 19 parts of 1-phenyl-4,5-dichlorpyridazone-(6) of the melting point 161° C. being obtained.

Elementary analysis: Calculated—C, 49.80; H, 2.49; O, 6.65; N, 11.60; Cl, 29.5. Found—C, 50.19; H, 2.77; O, 6.6; N, 11.39; Cl, 29.4.

Example 4

150 parts of 1-acetylamino-3-aminobenzene are diazotized in the way described in Example 1 and the diazo compound formed is reduced by adding 460 parts of crystallized tin (II) chloride. The mixture is stirred until the diazo compound can no longer be detected in a sample, and then 170 parts of crystallized mucochloric acid are added. The whole is stirred for 20 hours at room temperature, the 3-acetylaminophenyl hydrazone of mucochloric acid thereby separating in the form of orange-yellow crystals of the melting point 104° C. It is filtered off, washed with 2% aqueous hydrochloric acid and then with water and dried at 70° C. The yield is 285 parts, corresponding to 90% of the theory.

120 parts of this hydrazone are introduced at 20° C. into 300 parts of concentrated sulfuric acid and the mixture is stirred for 12 to 15 hours. It is then poured onto ice, 1 - (3-acetylaminophenyl)-4,5-dichlorpyridazone-(6) being obtained in the form of a pale yellow powder having the melting point 185° C.

Result of elementary analysis: Calculated—C, 48.31; H, 3.02; O, 10.74; N, 14.1; Cl; 23.8. Found—C, 48.34; H, 3.09; O, 11.2; N, 13.83; Cl, 23.6.

Example 5

69 parts of 1-aminobenzene-4-carboxylic acid are diazotized in conventional manner and reduced with 230 parts of tin (II) chloride. After adding 85 parts of mucochloric acid the mixture is stirred for 20 hours at room temperature and the reaction product filtered off. After drying it is introduced while stirring into 500 parts of concentrated sulfuric acid. The solution is stirred for another 12 to 15 hours and then poured into ice-water, 1-(4-carboxyphenyl)-4,5-dichlorpyridazone-(6) being obtained in a yield of 136 parts as a pale yellow powder of the melting point 314° to 316° C.

Example 6

A mixture of 120 parts of 4-methylphenyl hydrazine, 170 parts of mucochloric acid, 800 parts of water and 200 parts of concentrated sulfuric acid is boiled for two hours and the hot mixture filtered with the addition of a little activated carbon. From the filtrate there are obtained 210 parts of 1-(4-methylphenyl)-4,5-dichlorpyridazone-(6), corresponding to a yield of 82% of the theory. After recrystallization from normal propanol, the compound is obtained in the form of colorless lustrous scales of the melting point 146° C.

Elementary analysis gives: Calculated—C, 51.8; H, 3.14; O, 6.27; N, 10.98; Cl, 27.8. Found—C, 51.87; H, 3.23; O, 6.9; N, 10.41; Cl, 27.8.

26 parts of 1-(4-methylphenyl)-4,5-dichlorpyridazone-(6) are dissolved in 150 parts of concentrated sulfuric acid. After adding 7 parts by volume of 65% hydrochloric acid the mixture is heated for an hour at 60° to 70° C. The nitro compound obtained is reduced in the way described in Example 1. The resulting 1-(2-amino-4-methylphenyl)-4,5-dichlorpyridazone-(6) is available after recrystallization from normal propanol in the form of yellow crystals of the melting point 166° C.

Elementary analysis: Calculated—C, 48.9; H, 3.33; O, 5.92; N, 15.55; Cl, 26.25. Found—C, 49.17; H, 3.42; O, 6.3; N, 15.26; Cl, 26.0.

The same compound is obtained by the following manner of operation:

46 parts of 1-amino-2-nitro-4-methylbenzene are diazotized in conventional manner and the diazo compound is reduced by adding a solution of 150 parts of crystallized tin (II) chloride in 300 parts of 5% hydrochloric acid. After 15 minutes, 55 parts of mucochloric acid are added and the mixture is stirred for 12 hours at room temperature. After working up, the reaction product is obtained as a deep yellow compound in a yield of 84 parts.

The hydrazone thus obtained is introduced in dry state into 300 parts of concentrated sulfuric acid and the mixture is stirred for 12 to 20 hours at room temperature. It is then poured onto ice, 1-(2-nitro-4-methylphenyl)-4,5-dichlorpyridazone-(6) being obtained as a colorless powder of the melting point 192° C. (with decomposition). It is reduced as described in Example 1. There are obtained 68 parts of 1-(2-amino-4-methylphenyl)-4,5-dichlorpyridazone-(6) in the form of yellow prisms of the melting point 166° C.

Example 7

A mixture of 188 parts of 1-hydrazinobenzene-4-sulfonic acid, 170 parts of mucochloric acid, 2000 parts of water and 300 parts of concentrated hydrochloric acid is boiled for 30 minutes while stirring. After cooling, 280 parts of 1-(4-sulfophenyl)-4,5-dichlorpyridazone-(6) are obtained in the form of colorless crystals which, after recrystallization from 10% aqueous acetic acid, melt at above 300° C.

Elementary analysis: Calculated—C, 37.7; H, 1.87; O, 19.95; N, 8.73; S, 9.97; Cl, 22.09. Found—C, 37,72; H, 1.43; O, 20.1; N, 8.2; S, 10.1; Cl, 22.5.

Example 8

A mixture of 25 parts of 4-methylphenyl hydrazine, 52 parts of mucobromic acid, 600 parts of water and 120 parts of concentrated hydrochloric acid is boiled for 3 hours while stirring. The mixture is cooled and the reaction product is filtered off and then recrystallized twice from normal propanol. 45 parts of 1-(4-methylphenyl)-4,5-dibrompyridazone-(6) are obtained in the form of colorless crystals of the melting point 129° C.

Elementary analysis: Calculated—C, 38.70; H, 1.47; O, 4.69; N, 8.21; Br, 46.9. Found—C, 39.04; H, 1.85; O, 4.6; N, 8.40; Br, 46.4.

Example 9

A mixture of 6 parts of phenyl hydrazine, 13 parts of mucobromic acid and 150 parts of 5% hydrochloric acid is heated while stirring for an hour at 90° to 100° C. After working up, there are obtained 16 parts of 1-phenyl-4,5-dibrompyridazone-(6) of the melting point 142° C.

Elementary analysis gives: Calculated—C, 36.40; H, 1.82; O, 4.85; N, 8.48; Br, 48.5. Found—C, 36.71; H, 2.07; O, 5.0; N, 8.52; Br, 47.6.

Example 10

A mixture of 24 parts of 1-hydrazinonaphthalene-6-sulfonic acid, 17 parts of mucochloric acid and 300 parts of 10% sulfuric acid is heated at 90° C. for 3 hours. After cooling the reaction mixture, 31 parts of 1-(6-sulfonaphthyl-2)-4,5-dichloropyridazone-(6) are obtained. The reaction product has a melting point of above 300° C.

When using instead of 1-hydrazinonaphthalene-6-sulfonic acid an equal amount of 1-hydrazinonaphthalene-4-sulfonic acid and conducting the process in an analogous manner 1-(4-sulfonaphthyl-1)-4,5-dichloropyridazone-(6) is obtained.

We claim:

The process for the production of 1-aryl-4,5-dihalogenpyridazone-(6) which comprises heating a mucohalic acid selected from the class consisting of mucochloric acid and mucobromic acid in an aqueous mineral acid solution selected from the group consisting of dilute sulfuric acid solution and dilute hydrochloric acid solution, wherein the acid concentration in said dilute acid solutions ranges from 5% to 20% by weight, at 70° to 100° C. with an aryl hydrazine selected from the class consisting of alpha-naphthyl hydrazine, beta-naphthyl hydrazine and phenyl hydrazines of the formula

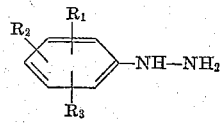

in which $R_1$ represents a substituent from the class consisting of a hydrogen atom, a carboxy group and a sulfonic acid group, $R_2$ represents a substituent from the class consisting of a hydrogen atom, a nitro group, a formylamino group, an acetylamino group, an oxalylamino group and a benzoylamino group and $R_3$ represents a substituent from the class consisting of a hydrogen atom, a methyl group and a methoxy group to produce the 1-aryl-4,5-dihalogenpyridazone-(6).

References Cited in the file of this patent

UNITED STATES PATENTS 2,628,181   Mowry ---------------- Feb. 10, 1953

OTHER REFERENCES

Bistrzycki et al.: Chem. Berichte, vol. 32 (1899), pages 534–6.

Bistrzycki et al.: Chem. Berichte, vol. 34 (1901), pages 1010–21.

MacArdle: Use of Solvents (1925), page 25.